United States Patent [19]
Chen

[11] Patent Number: 6,055,733
[45] Date of Patent: May 2, 2000

[54] EXTENSIBLE CUTLERY DEVICE

[76] Inventor: Yih-Long Chen, 58, Ma Yuan West St., Taichung, Taiwan

[21] Appl. No.: 09/305,271

[22] Filed: May 3, 1999

[51] Int. Cl.$^7$ ..................................................... A47J 43/28
[52] U.S. Cl. ................................ 30/142; 30/143; 30/322; 30/340; 30/342; 16/115
[58] Field of Search ............................. 30/142, 143, 135, 30/322, 324, 340, 162, 342; 16/115

[56] References Cited

U.S. PATENT DOCUMENTS

| | | | |
|---|---|---|---|
| 825,976 | 7/1906 | Neiglick | 30/162 |
| 3,266,144 | 8/1966 | Fishlove | 30/322 |
| 3,906,632 | 9/1975 | Oppenheimer | 30/322 |
| 5,206,998 | 5/1993 | Oriente et al. | 30/142 |
| 5,774,994 | 7/1998 | Stein et al. | 30/162 |

*Primary Examiner*—Kenneth E. Peterson
*Assistant Examiner*—Sean Pryor

[57] ABSTRACT

An extensible cutlery device has a hollow tube, a first casing disposed in the hollow tube, a second casing disposed in the hollow tube, and a fork device disposed between the first casing and the second casing. The first casing engages with the second casing. The fork device has a handle inserted in a spacing defined between the first casing and the second casing. A drive mechanism drives the fork device to extend and retract. A plug seat has two hook ends inserted in a rear end of the hollow tube.

3 Claims, 5 Drawing Sheets

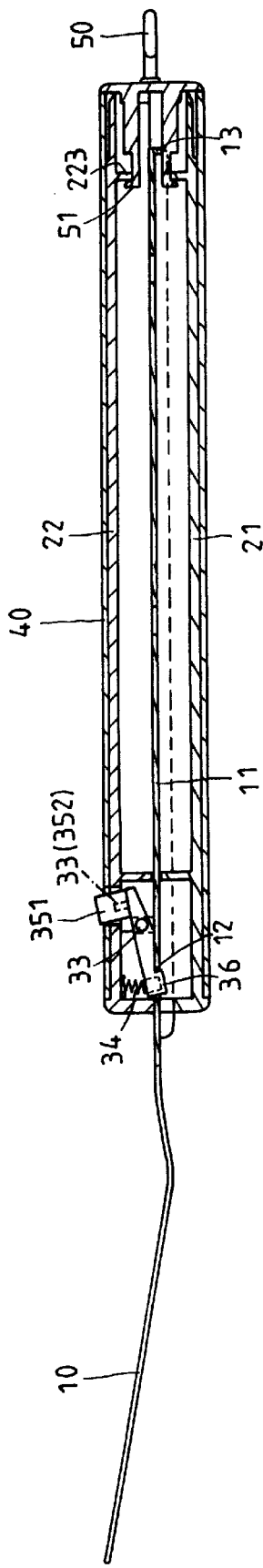
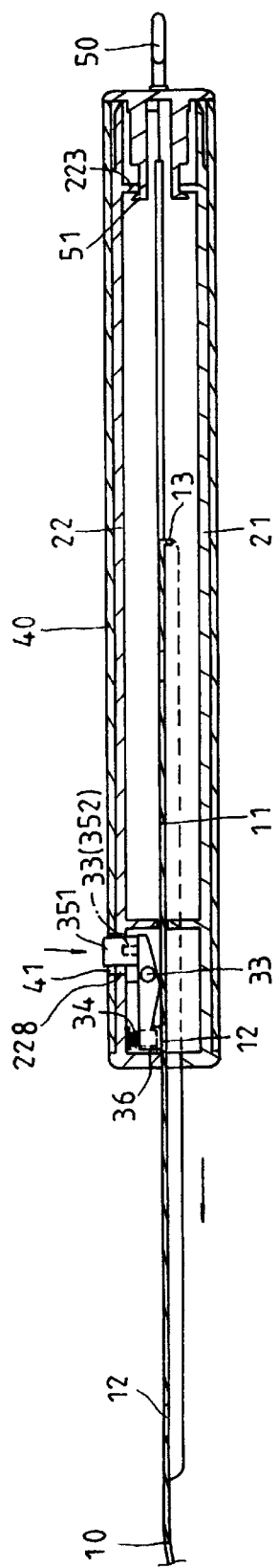
FIG. 2
FIG. 3

6,055,733

EXTENSIBLE CUTLERY DEVICE

BACKGROUND OF THE INVENTION

The present invention relates to an extensible cutlery device. More particularly, the present invention relates to an extensible cutlery device which can be extended and retracted.

Conventional cutlery devices such as forks, spoons, knives, and steel brushes have fixed handles. Since the handles are fixed, the conventional cutlery device cannot be extended nor retracted.

SUMMARY OF THE INVENTION

An object of the present invention is to provide an extensible cutlery device which can be extended and retracted.

Accordingly, an extensible cutlery device comprises a hollow tube, a first casing disposed in the hollow tube, a second casing disposed in the hollow tube, and a dinner utensil disposed between the first casing and the second casing. The first casing engages with the second casing. The dinner utensil has a handle. The handle has an end block and a plurality of positioning holes. A cross-section of the handle is in a U-shape. The first casing has two blocking bars, a first insertion groove, two slots, two end blocking flanges, and four corner columns. The second casing has two blocking plates, a second insertion groove, a front groove, two notches communicating with the front groove, a round recess communicating with the front groove, a through hole communicating with the front groove, two distal blocking flanges, and four hollow corner posts. The handle is inserted in the first insertion groove and the second insertion groove. The hollow tube has an oblong hole matching the through hole of the second casing. A drive mechanism is inserted in the front groove. The drive mechanism has a spring inserted in the round recess, a push button inserted through the through hole of the second casing and the oblong hole of the hollow tube, and a drive block having two pillars, a positioning post, a circular recess defined by the positioning post to receive the spring, and two protruded blocks inserted in the notches. The push button has a pressing portion, and two blind holes receiving the pillars. The corner columns are inserted in the hollow corner posts. The positioning post is inserted in one of the positioning holes of the handle.

BRIEF DESCRIPTION OF THE DRAWINGS

FIG. 2 is a sectional assembly view of an extensible cutlery device of a preferred embodiment in accordance with the present invention;

FIG. 3 is a schematic view illustrating a fork device is extended;

DETAILED DESCRIPTION OF THE INVENTION

Figure 1:
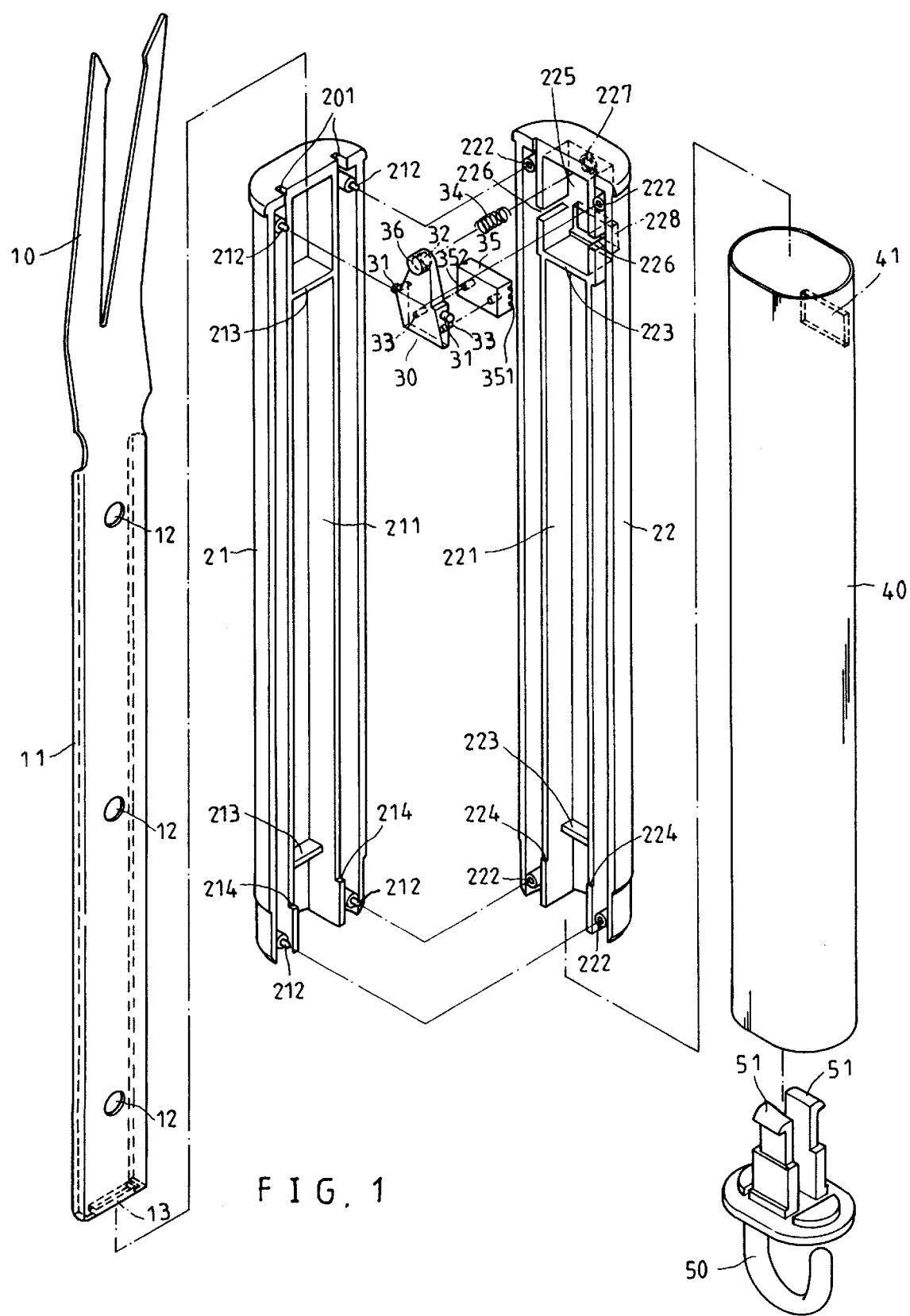
FIG. 1 is a perspective exploded view of an extensible cutlery device of a preferred embodiment in accordance with the present invention.

Referring to FIGS. 1, 2, and 3 first, an extensible cutlery device comprises a hollow tube 40, a first casing 21 disposed in the hollow tube 40, a second casing 22 disposed in the hollow tube 40, and a fork device 10 disposed between the first casing 21 and the second casing 22. The first casing 21 engages with the second casing 22.

The fork device 10 has a handle 11. The handle 11 has an end block 13 and a plurality of positioning holes 12. A cross-section of the handle 11 is in a U-shape.

The first casing 21 has two blocking bars 213, a first insertion groove 211, two slots 201, two end blocking flanges 214, and four corner columns 212.

The second casing 22 has two blocking plates 223, a second insertion groove 221, a front groove 225, two notches 226 communicating with the front groove 225, a round recess 227 communicating with the front groove 225, a through-hole 228 communicating with the front groove 225, two distal blocking flanges 224, and four hollow corner posts 222.

The handle 11 is inserted in the first insertion groove 211 and the second insertion groove 221.

The hollow tube 40 has an oblong hole 41 matching the through-hole 228 of the second casing 22.

A drive mechanism is inserted in the front groove 225. The drive mechanism has a spring 34 inserted in the round recess 227, a push button 35 inserted through the through-hole 228 of the second casing 22 and the oblong hole 41 of the hollow tube 40, and a drive block 30 having two pillars 33, a positioning post 36, a circular recess 32 defined by the positioning post 36 to receive the spring 34, and two protruded blocks 31 inserted in the notches 226.

The push button 35 has a pressing portion 351, and two blind holes 352 receiving the pillars 33.

The corner columns 212 are inserted in the hollow corner posts 222.

The positioning post 36 is inserted in one of the positioning holes 12 of the handle 11.

A plug seat 50 has two hook ends 51 inserted in a rear end of the hollow tube 40.

Referring to FIG. 3 again, the pressing portion 351 of the push button 35 is pressed downward so that the positioning post 36 will move upward. Therefore, the positioning post 36 disengages from one of the positioning holes 12 of the handle 11.

Figure 1A:
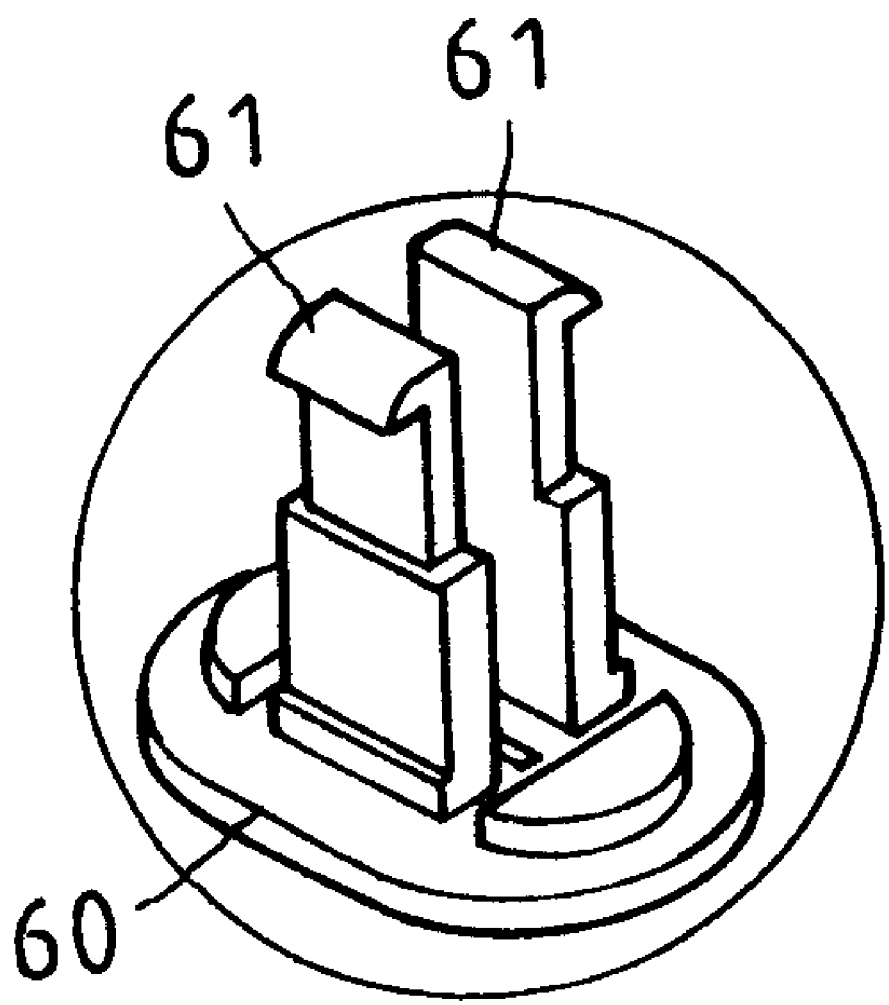
FIG. 1A is a perspective view of a plug seat without a hook.

Referring to FIG. 1A, a second plug seat 60 has two hook ends 61.

Figure 4:
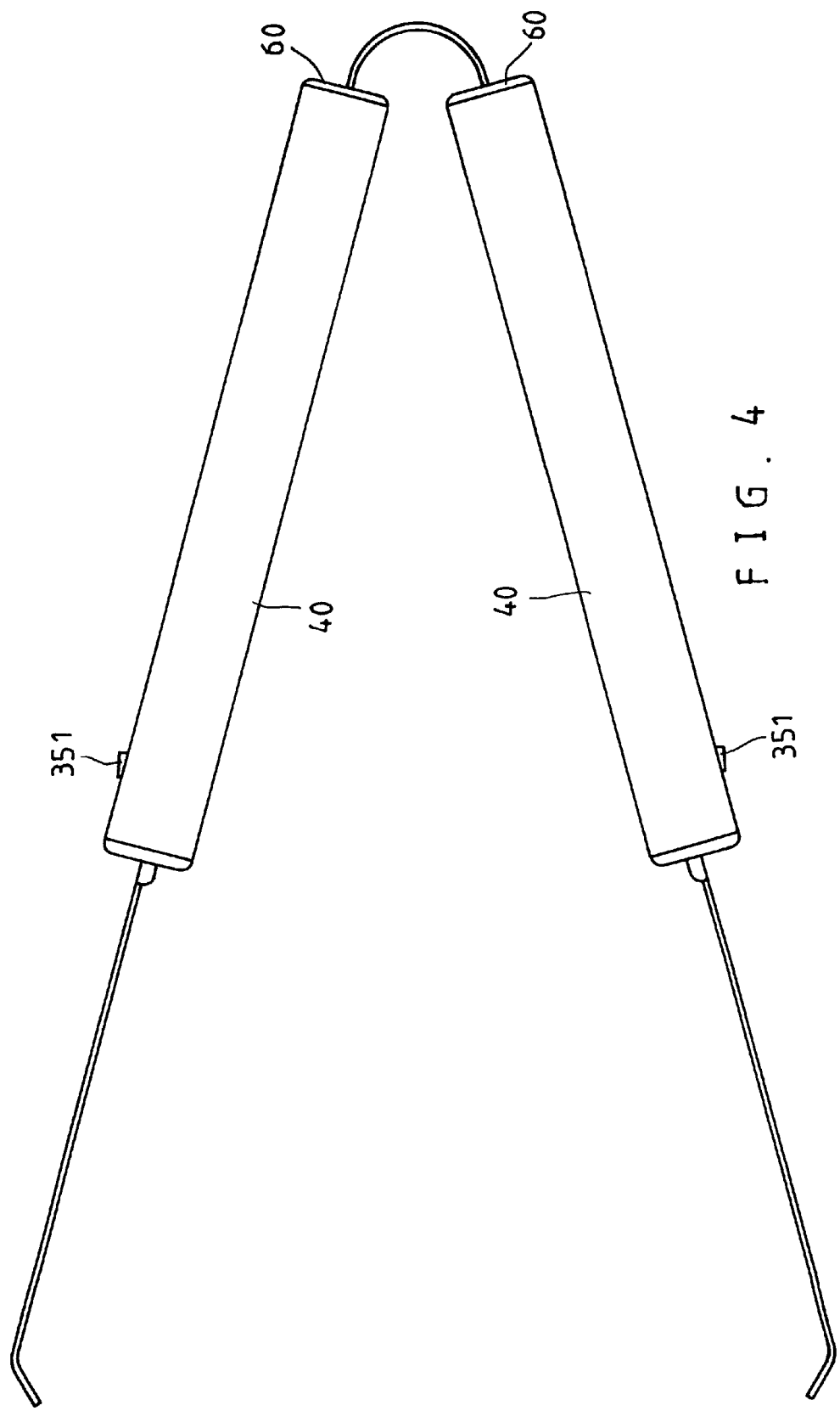
FIG. 4 is an elevational view of a pair of extensible tongs.

Referring to FIG. 4, a pair of extensible tongs is illustrated.

Figure 5:
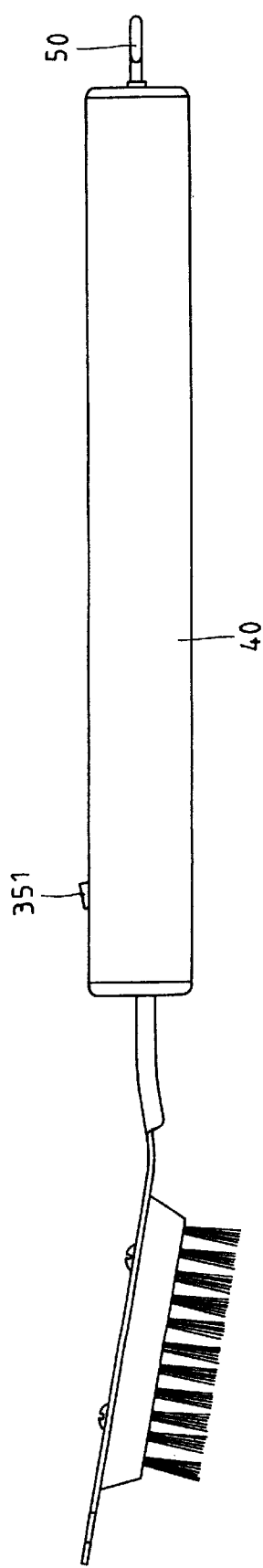
FIG. 5 is an elevational view of an extensible steel brush.

Referring to FIG. 5, the fork device is replaced by a steel brush.

Figure 6:
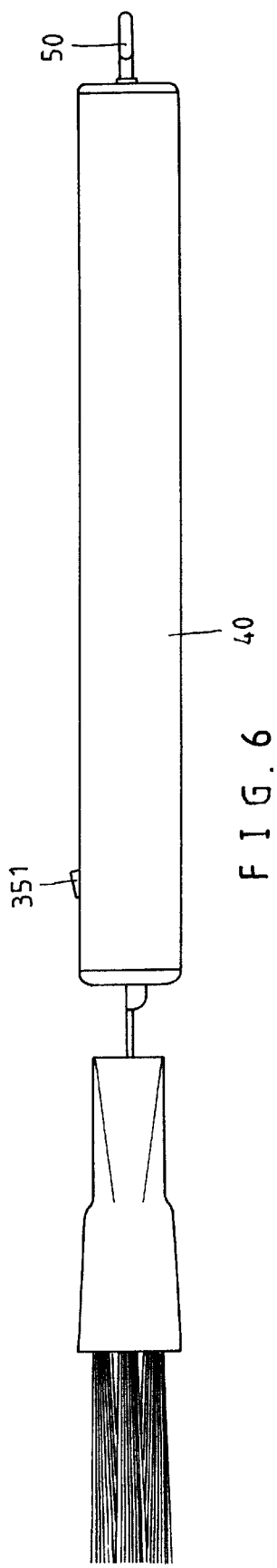
FIG. 6 is an elevational view of an extensible brush.

Referring to FIG. 6, the fork device is replaced by a brush.

The present invention is not limited to the above embodiments but various modification thereof may be made. Furthermore, various changes in form and detail may be made without departing from the scope of the present invention.

I claim:

1. An extensible cutlery device comprises:

a hollow tube, a first casing disposed in the hollow tube, a second casing disposed in the hollow tube, and a dinner utensil disposed between the first casing and the second casing, the first casing engaging with the second casing, the dinner utensil having a handle, the handle having an end block and a plurality of positioning holes, a cross-section of the handle being in a U-shape, the first casing having two blocking bars, a first insertion groove, two slots, two end blocking flanges, and four corner columns, the second casing having two blocking plates, a second insertion groove, a front groove, two notches communicating with the front groove, a round recess communicating with the front groove, a through-hole communicating with the front groove, two distal blocking flanges, and four hollow corner posts, the handle inserted in the first insertion groove and the second insertion groove, the hollow tube having an oblong hole matching the through-hole of the second casing, a drive mechanism inserted in the front groove, the drive mechanism having a spring inserted in the round recess, a push button inserted through the through-hole of the second casing and the oblong hole of the hollow tube, and a drive block having two pillars, a positioning post, a circular recess defined by the positioning post to receive the spring, and two protruded blocks inserted into notches, the push button having a pressing portion, and two blind holes receiving the pillars, the corner columns inserted in the hollow corner posts, and the positioning post inserted in one of the positioning holes of the handle.

2. The extensible cutlery device as claimed in claim 1, wherein a plug seat has two hook ends inserted in a rear end of the hollow tube.

3. The extensible cutlery device as claimed in claim 1, wherein the dinner utensil is a fork device.

\* \* \* \* \*